US012773609B2

(12) United States Patent
Lu

(10) Patent No.: US 12,773,609 B2
(45) Date of Patent: Oct. 27, 2026

(54) THROWING ROD STRUCTURE

(71) Applicant: NINGBO SINCERE HOLDING GROUP CO., LTD., Ningbo City (CN)

(72) Inventor: Charley Lu, Ningbo City (CN)

(73) Assignee: NINGBO SINCERE HOLDING GROUP CO., LTD., Ningbo City (CN)

( * ) Notice: Subject to any disclaimer, the term of this patent is extended or adjusted under 35 U.S.C. 154(b) by 0 days.

(21) Appl. No.: 19/070,547

(22) Filed: Mar. 5, 2025

(65) Prior Publication Data

US 2026/0061276 A1 Mar. 5, 2026

(30) Foreign Application Priority Data

Sep. 5, 2024 (CN) ......................... 202411240090.1

(51) Int. Cl.
*A63B 65/00* (2006.01)
*A63B 65/12* (2006.01)
*A01K 15/02* (2006.01)

(52) U.S. Cl.
CPC .......... *A63B 65/122* (2013.01); *A01K 15/025* (2013.01); *A63B 2210/50* (2013.01)

(58) Field of Classification Search
CPC ....... A63B 53/10; A63B 59/20; A63B 65/122; A63B 2210/50; A63B 2208/14; A01K 15/025
USPC .......................................... 119/707; 473/316
See application file for complete search history.

(56) References Cited

U.S. PATENT DOCUMENTS 5,474,032 A * 12/1995 Krietzman ........... A01K 15/025 473/430
5,737,752 A * 4/1998 Hilditch ................ G06F 12/127 711/134
7,207,897 B2 * 4/2007 Burch .................... A63B 53/02 473/307
11,547,090 B2 * 1/2023 Yang .................... A01K 15/025
11,779,815 B1 * 10/2023 Billings ............... A63B 53/022 473/307
2009/0025699 A1 * 1/2009 Mongkolkasetarin ....................... A01K 15/025 124/26

* cited by examiner

*Primary Examiner* — Richard T Price, Jr.
(74) *Attorney, Agent, or Firm* — Che-Yang Chen

(57) ABSTRACT

This application provides a throwing rod structure that includes a connector with an elastic portion. The throwing rod assembly comprises a throwing rod handle and a throwing rod head, where the throwing rod handle and the throwing rod head are detachably connected to the connector, and the elastic portion is located between the throwing rod handle and the throwing rod head. The throwing rod handle and the throwing rod head are detachably connected via the connector, enabling the replacement of the throwing rod head. The elastic portion of the connector is located between the throwing rod handle and the throwing rod head. At the moment of toy launching, the elastic effect of the elastic portion increases the work done on the toy's running thread, improving the launch speed and accelerating the toy's rotation.

16 Claims, 6 Drawing Sheets

THROWING ROD STRUCTURE

CROSS-REFERENCE TO RELATED APPLICATIONS

This application claims priority to Chinese Patent Application No. 202411240090.1, filed on Sep. 5, 2024, the content of which is incorporated herein by reference in its entirety.

TECHNICAL FIELD

The present application relates to the field of pet products, and specifically to a throwing rod structure.

BACKGROUND

The pet throwing rod structure is a pet toy, typically consisting of a rod body and a hemispherical ball socket at the end of the rod body. When in use, a toy ball is placed into the ball socket, the rod body is gripped, and then forcefully thrown forward. Due to inertia, the toy ball will fly forward, allowing the pet dog to chase the ball and bring it back to the owner. Regular use can enhance the dog's reaction ability and cooperation skills.

In related technologies, the pet throwing rod structure needs to be convenient for carrying, while also providing playfulness. Therefore, there is an urgent need for a throwing rod structure that can increase the enjoyment during play.

SUMMARY

The purpose of this application is to provide a throwing rod structure that can enhance the user's enjoyment during play.

In a first aspect, an embodiment of this application provides a throwing rod structure, which comprises a connector configured with an elastic portion; a throwing rod assembly, including a throwing rod handle and a throwing rod head, wherein the throwing rod handle and the throwing rod head are respectively detachably connected to the connector, wherein the elastic portion is located between the throwing rod handle and the throwing rod head.

In the process of implementation described above, the throwing rod handle and the throwing rod head are detachably connected through the connector, allowing for the replacement of the throwing rod head. The elastic portion of the connector is located between the throwing rod handle and the throwing rod head. At the moment of launching the toy, the elasticity of the elastic portion increases the work done on the toy's running thread, improving the launch speed. It can also accelerate the rotation of the toy at the moment of launch, thereby achieving the Magnus effect in the toy during high-speed launch. The turbulent boundary layer generated by shallow vortices at high rotational speeds reduces aerodynamic drag, enhancing the user's play experience.

In some embodiments, the elastic portion is configured with a first elastic surface and a second elastic surface, wherein the first elastic surface and the second elastic surface are oppositely distributed, wherein at least a part of the structure of the first elastic surface is concave toward the second elastic surface to form a first corrugated tooth, wherein at least a part of the structure of the second elastic surface is concave toward the first elastic surface to form a second corrugated tooth.

In the process described above, the first elastic surface is provided with a first corrugated tooth, and the second elastic surface is provided with a second corrugated tooth. At the moment of launching the toy, both the first and second elastic surfaces deform, ensuring good elastic deformation space, and also enhancing the effect of the elastic portion being less prone to damage or breakage. This increases the work done on the toy's running thread, improving the launch speed. It can also accelerate the toy's rotation at launch, leading to the Magnus effect, where the turbulent boundary layer caused by shallow vortices reduces aerodynamic drag, increasing the curved flight path.

In some embodiments, the first corrugated teeth and the second corrugated teeth are distributed in an interlaced manner.

In the process described above, by interlacing the first corrugated teeth with the second corrugated teeth, not only can good elastic deformation space be ensured, but the middle section of the connector is less likely to be damaged or broken. This also increases the work done on the toy's running thread, improving the launch speed, and accelerating the toy's rotation at launch. This results in the Magnus effect, where the turbulent boundary layer caused by shallow vortices reduces aerodynamic drag, increasing the curved flight path.

In some embodiments, the connector further includes a first connecting portion, which is connected to the elastic portion, and the first connecting portion is located in the inner cavity of the throwing rod handle.

In the process described above, the connector is detachably connected to the throwing rod handle via the first connecting portion, ensuring that the elastic portion is located between the throwing rod handle and the throwing rod head. This helps increase the curved flight path. Additionally, under the effect of the first connecting portion, the connection between the connector and the throwing rod handle becomes more secure, preventing loosening, while providing some elastic space to avoid damage or breakage of the connector.

In some embodiments, two opposite sides of the first connecting portion are provided with a first connecting surface, which is configured in a rack shape, wherein the position of the rack on the first connecting surface is used to connect with the throwing rod handle.

In the process described above, the first connecting surface is connected to the throwing rod handle via its rack position, ensuring that the connection between the connector and the throwing rod handle is more secure, preventing loosening, and providing some elastic space to avoid damage or breakage of the connector.

In some embodiments, the connector further includes a second connecting portion, which is located on the side of the elastic portion opposite to the first connecting portion, wherein the second connecting portion is configured in the inner cavity of the throwing rod head.

In the process described above, the connector is detachably connected to the throwing rod head via the second connecting portion, ensuring that the elastic portion is located between the throwing rod handle and the throwing rod head. This helps increase the curved flight path. Additionally, under the effect of the second connecting portion, the connection between the connector and the throwing rod head becomes more secure, preventing loosening, while providing some elastic space to avoid damage or breakage of the connector.

In some embodiments, two opposite sides of the second connecting portion are provided with a second connecting surface, which is configured in a rack shape, wherein the position of the rack on the second connecting portion is used to connect with the throwing rod head.

In the process described above, the second connecting surface is connected to the throwing rod head via its rack position, ensuring that the connection between the connector and the throwing rod head is more secure, preventing loosening, and providing some elastic space to avoid damage or breakage of the connector.

In some embodiments, the throwing rod handle includes a throwing rod member and a handle member, which locates on the side of the throwing rod member opposite to the connector, wherein the handle member is connected to the throwing rod member.

In some embodiments, the throwing rod member is configured to be foldable.

In the process described above, by making the throwing rod member foldable, the size of the throwing rod member can be reduced, saving packaging space, and making packaging and transportation more convenient. After folding, the toy can be installed in the throwing rod head, and once the toy is launched, the throwing rod handle tends to straighten out. The toy's accelerated thread is increased, allowing for greater momentum and achieving longer launch distances.

In some embodiments, the throwing rod structure further includes an anti-slip member, which is connected to the throwing rod handle.

In the process described above, by providing an anti-slip member on the throwing rod handle, it can improve sweat absorption and increase friction, preventing the rod from slipping during launch. It also provides a more comfortable grip during launching, enhancing the user's experience.

Other features and advantages of this application will be explained in the subsequent description, or some features and advantages can be inferred or clearly identified from the description or through implementing the technology described herein.

To make the above objectives, features, and advantages of this application more apparent and understandable, the following preferred embodiments are provided, along with accompanying Figs, for detailed explanation.

DETAILED DESCRIPTION OF THE EMBODIMENTS

Figure 1:
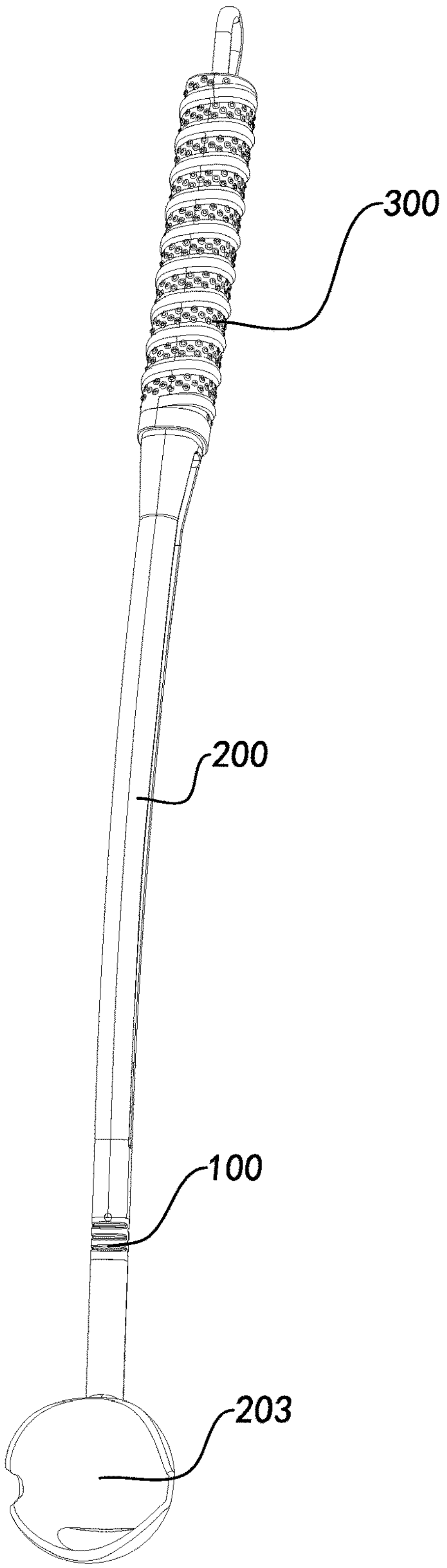
FIG. 1 is a schematic structural diagram of the throwing rod structure provided in an embodiment of this application.

Hereinafter, the technical solutions in the embodiments of the present disclosure will be clearly and completely described with reference to the accompanying drawings in the embodiments of the present disclosure, and it is obvious that the described embodiments are only a portion of the embodiments of the present disclosure, but not all the embodiments. The components of the embodiments of the present disclosure generally described and illustrated in the drawings herein may be arranged and designed in a variety of different configurations. Accordingly, the following detailed description of embodiments of the disclosure provided in the accompanying drawings is not intended to limit the scope of the claimed disclosure, but is merely to represent selected embodiments of the disclosure. Based on the embodiments of the present disclosure, all other embodiments obtained by those skilled in the art without making creative work belong to the scope of protection of the present disclosure.

In the present disclosure, the orientation or positional relationship indicated by the terms "upper", "lower", "left", "right", "front", "back", "top", "bottom", "inner", "outer", "middle", "vertical", "horizontal", "longitudinal" and the like is based on the orientation or positional relationship shown in the drawings. These terms are primarily intended to better describe the disclosure and embodiments thereof and are not intended to limit that the indicated device, element, or member must have a specific orientation, or be constructed and operated in a specific orientation.

Moreover, some of the above terms may be used to mean other meanings in addition to orientation or positional relationships, for example, the term "on" may also be used to mean some kind of attachment or connection relationship in some cases. The specific meanings of these terms in the present disclosure can be understood by those of ordinary skill in the art according to the specific circumstances.

Furthermore, the terms "mounted", "provided", "connected", and "disposed" are to be understood broadly. For example, it may be a fixed connection, a detachable connection, or a monolithic construction; may be a mechanical connection or a point connection. It may be directly connected, indirectly connected through an intermediate medium, or internal communication between two devices, elements, or members. Those skilled in the art can understand the specific meanings of the above-mentioned terms in the present disclosure according to the specific circumstances.

Furthermore, the terms "first", "second", and the like are primarily used to distinguish between different devices, elements, or members (specific kinds and configurations may or may not be the same), and are not intended to indicate or imply the relative importance and the number of indicated devices, elements, or members. Unless otherwise specified, "a plurality of" means two or more.

With the continuous improvement of living standards in our country, more and more residents are keeping pets, especially pet dogs, which are highly favored by pet lovers. Keeping pets can not only help pass the time but also enhance the bond between pets and their owners through interaction, and enrich life and increase happiness. Since balls have a strong appeal to pets, pet toy balls are frequently used during interactions. A ball-throwing stick is a tool designed for such interactions, typically used by placing a toy ball into a ball slot. When the rod is forcefully swung forward by hand, the toy ball will be propelled forward due to inertia, traveling a relatively long distance. This allows the pet dog to chase after the toy ball, for achieving the purpose of human-pet interaction.

During the design process, the inventor discovered that the existing ball-throwing sticks are mostly designed as an integrated structure with a long length, making them bulky and inconvenient to carry. Additionally, traditional ball-throwing sticks can only launch pet balls and are not compatible with different types of pet toys. They lack the flexibility to replace the throwing head for launching various pet toys. Furthermore, the handles of existing ball-throwing sticks are usually made of a single-piece molded plastic with a relatively smooth surface. Even when textured with grooves to increase friction, they can still slip or be difficult to grip when hands are sweaty, leading to ineffective throws or failed ball launches.

In view of this, as shown in FIGS. 1 to 6, a first aspect of the present application provides a throwing rod structure, which includes a connector 100 and a throwing rod assembly 200. The connector 100 is detachably connected to the throwing rod assembly 200. The connector 100 not only provides an elastic function, allowing the flight path of the toy 400 to be extended during launching, but also enables the replacement of the throwing rod head 203 of the throwing rod assembly 200 by detaching the connector 100. Thus, by utilizing the throwing rod structure, different toys 400 can be launched.

Specifically, the connector 100 is configured with an elastic portion 101. The throwing rod assembly 200 includes a throwing rod handle and a throwing rod head 203, which are detachably connected to the connector 100. The elastic portion 101 is positioned between the throwing rod handle and the throwing rod head 203.

Exemplarily, the connector 100 includes, but is not limited to, an elastic body. The connection between the connector 100 and both the throwing rod handle and the throwing rod head 203 can be a detachable snap-fit connection. In practice, a threaded snap-fit connection can also be used. However, in this case, a serrated snap-fit connection is preferred, as it optimally secures the connection while allowing the connecting portions (102 and 103) to maintain appropriate elasticity. This works in coordination with the elastic portion 101 to enhance the elastic effect, thereby providing the best throwing experience for the throwing rod.

It can be understood that the toy 400 adapted to the throwing rod head 203 includes, but is not limited to, a tennis ball. The connector 100 is the key component enabling the Magnus effect after the ball is launched. At the moment of launch, due to the combined action of the elastic portion 101 and the connecting portions 102 and 103, the system not only increases the work done on the ball's trajectory, thereby enhancing the serving speed, but also accelerates its spin at the moment of launch. This results in the Magnus effect occurring during high-speed flight, enhancing the user's enjoyment of play. At high spin speeds of the ball the turbulent boundary layer generated by the shallow dimples reduces aerodynamic drag. After being launched, the induced turbulence in the air layer near the moving ball (the "boundary layer") causes the backspin of the ball to generate the Magnus effect or aerodynamic lift. This allows the projectile to rise as it travels, enabling the user to achieve a significantly extended throwing distance and a more enjoyable curved flight path.

The toy 400 adapted to the throwing rod head 203 includes, but is not limited to, spherical objects such as tennis balls. By detachably connecting the connector 100 to the throwing rod head 203, the throwing rod head 203 can be replaced to accommodate different toys 400. In other embodiments, the throwing rod head 203 includes a connecting rod and a claw 2031. The claw 2031 is connected to the connecting rod, and the side of the connecting rod opposite to the claw 2031 is used for connecting to the connector 100. The claw 2031 is configured with multiple claw teeth, which are distributed at intervals.

The claw 2031 and the connecting rod can be designed as an integrated structure or as a separate, detachable connection. For example, at least one claw 2031 can be rotatably connected to the connecting rod (e.g., via a threaded connection) or slidably connected (e.g., where either the connecting rod or the claw 2031 is provided with a sliding groove, while the other is equipped with a sliding block that fits into the groove). To ensure the claw 2031 securely grips the toy 400, a return spring can be used to connect the claw 2031 to the connecting rod. Regardless of whether the gripping size needs to be increased or decreased, the return spring remains in a compressed state. This allows the claw 2031 to adjust the gripping size of the throwing rod head 203, thereby enabling compatibility with different toys 400.

In the implementation process described above, the throwing rod handle and the throwing rod head 203 are detachably connected through the connector 100, allowing for the replacement of the throwing rod head 203. The elastic portion 101 of the connector 100 is positioned between the throwing rod handle and the throwing rod head 203. At the moment of launching the toy 400, the elasticity of the elastic portion 101 not only increases the work done on the toy 400's trajectory, thereby enhancing the launch speed, but also accelerates its rotation at the moment of launch. This results in the Magnus effect occurring during high-speed flight. At high rotational speeds, the turbulent boundary layer created by the shallow dimples reduces aerodynamic drag, thereby enhancing the user's playing experience.

Figure 2:
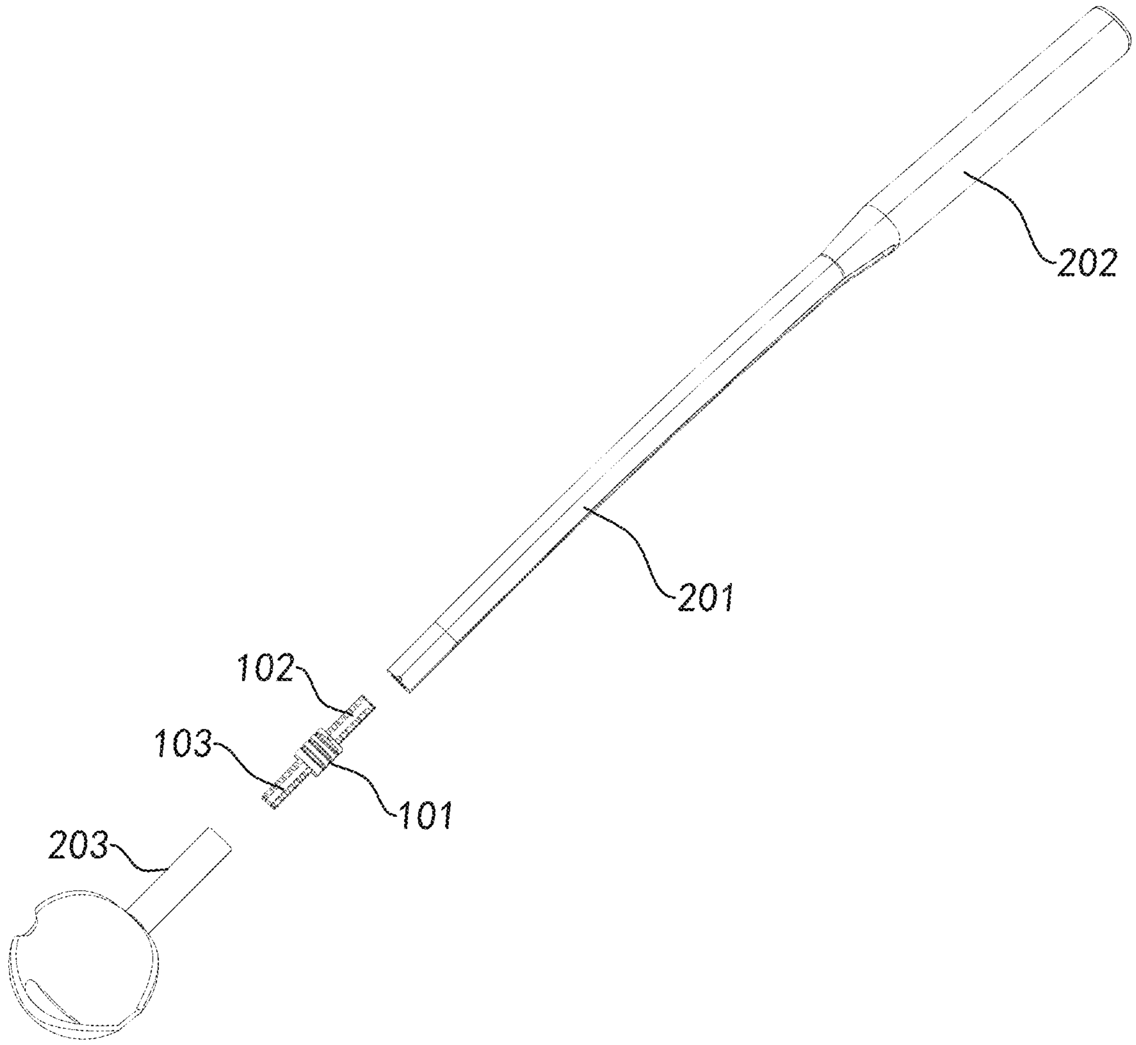
FIG. 2 is a partially exploded schematic diagram of the throwing rod structure provided in an embodiment of this application.
Figure 3:
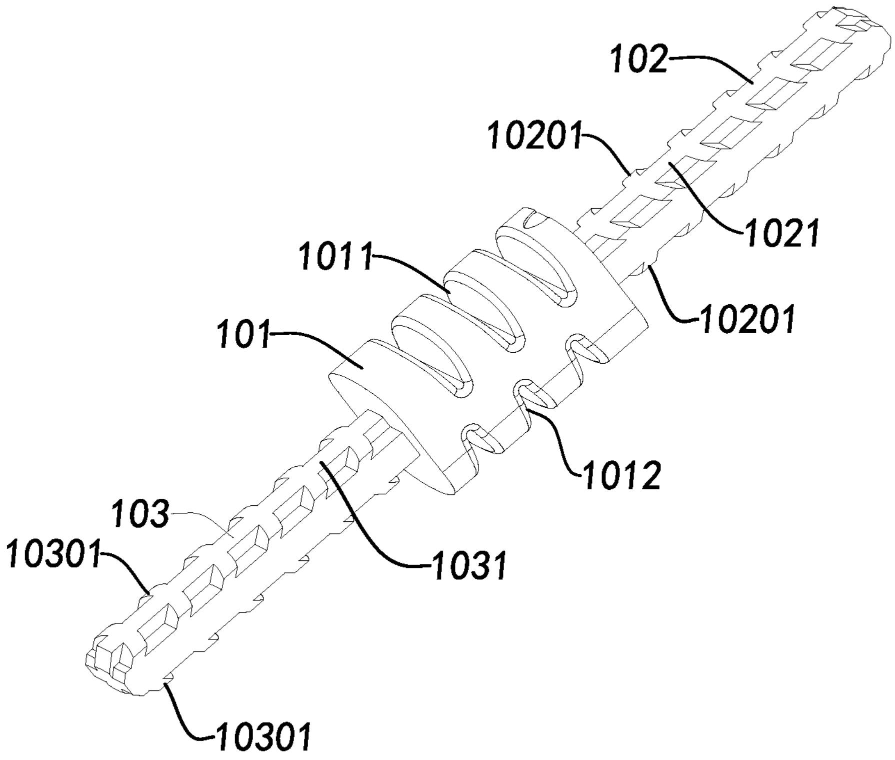
FIG. 3 is a schematic structural diagram of the connector of the throwing rod structure provided in an embodiment of this application.
Figure 4:
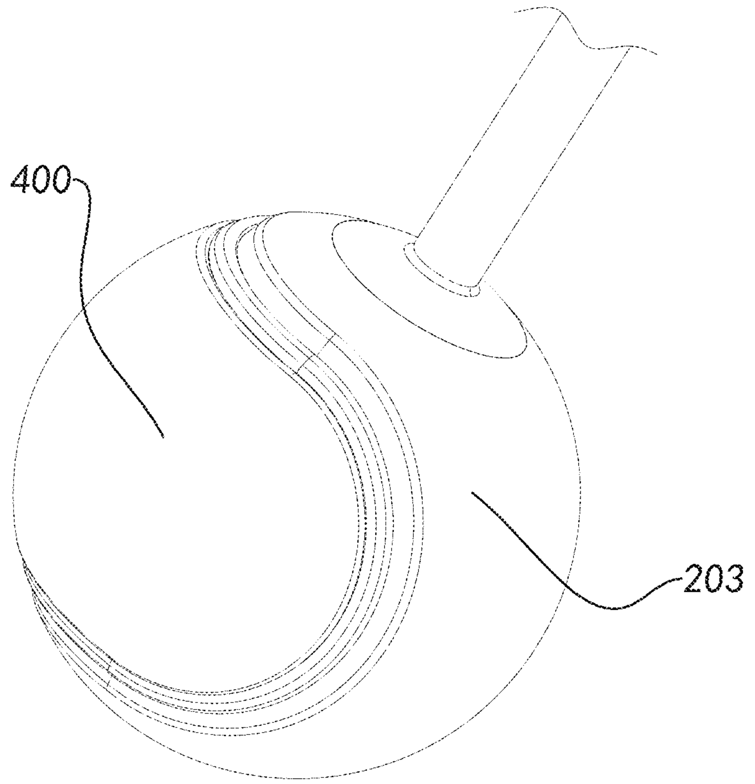
FIG. 4 is a schematic structural diagram of the throwing rod head gripping a toy in the throwing rod structure provided in an embodiment of this application.
Figure 5A:
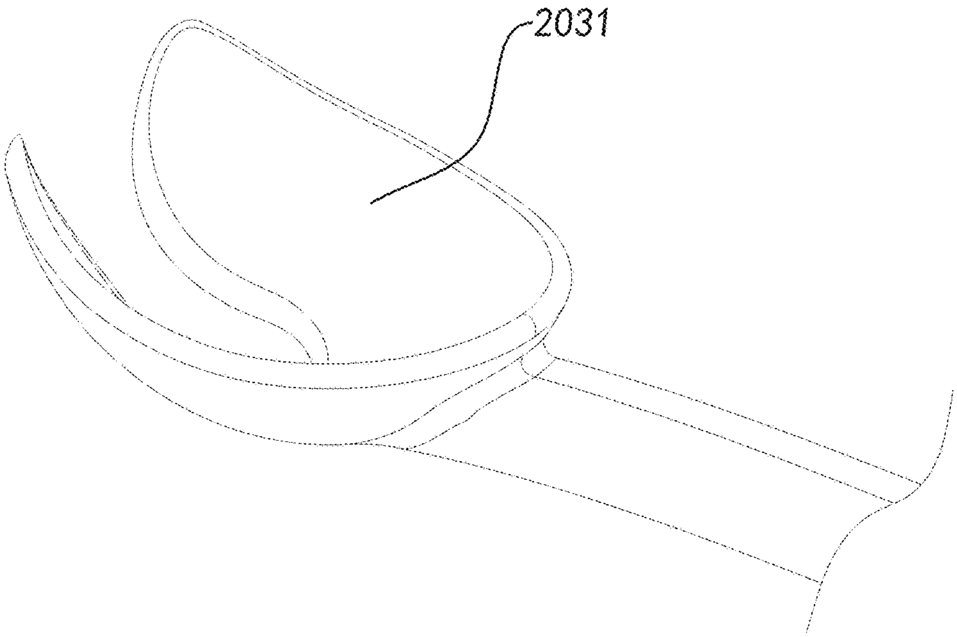
FIG. 5A is a schematic structural diagram of the first embodiment of the throwing rod head in the throwing rod structure provided in an embodiment of this application.
Figure 5B:
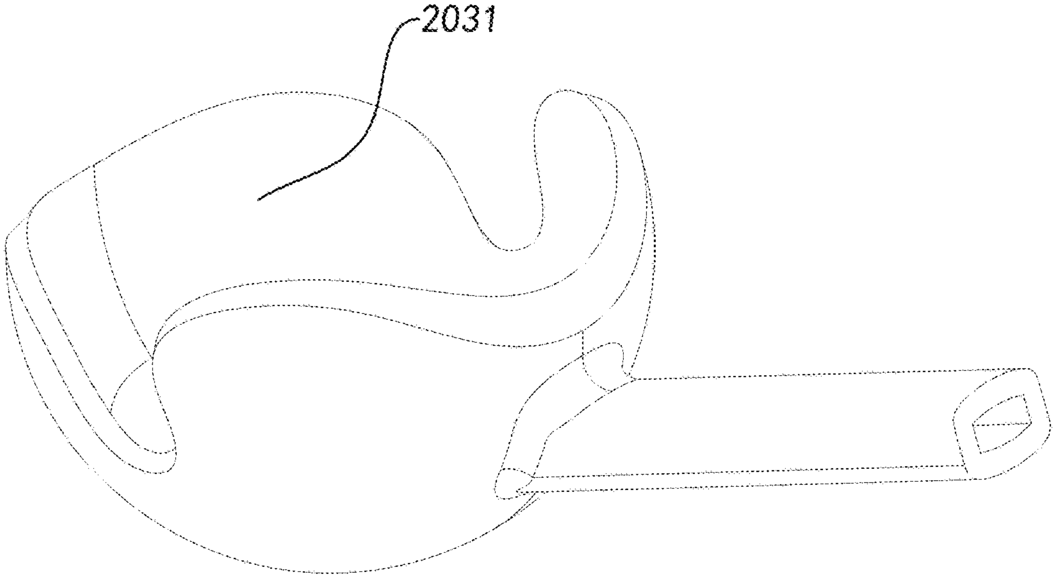
FIG. 5B is a schematic structural diagram of the second embodiment of the throwing rod head in the throwing rod structure provided in an embodiment of this application.

As shown in FIGS. 2 and 3, the elastic portion 101 is configured with a first elastic surface and a second elastic surface, which are arranged opposite to each other. At least part of the structure of the first elastic surface is concave toward the second elastic surface to form the first corrugated tooth 1011, while at least part of the structure of the second elastic surface is concave toward the first elastic surface to form the second corrugated tooth 1012.

Exemplarily, the elastic portion 101 includes, but is not limited to, rubber, and it can also be made of plastic or other materials. The first elastic surface is positioned at the upper end, while the second elastic surface is positioned at the lower end. During the throwing action of the throwing rod assembly 200, the first elastic surface can be in a compressed state, while the second elastic surface is in a stretched state. Through the cooperation of these two surfaces, the elastic portion 101 is ensured to have a certain degree of elasticity In the implementation process described above, the first elastic surface is provided with first corrugated teeth 1011, and the second elastic surface is provided with second corrugated teeth 1012. At the moment of launching the toy 400, both the first and second elastic surfaces undergo deformation. In traditional designs, this can easily lead to breakage or damage. To ensure sufficient elastic deformation space and enhance the durability of the elastic portion 101, preventing it from easily breaking, some embodiments adopt an interleaved distribution of the first corrugated teeth 1011 and the second corrugated teeth 1012. This design maintains elasticity while ensuring the structural integrity of the elastic portion 101, making it more resistant to breakage.

In the implementation process described above, the interleaved arrangement of the first corrugated teeth 1011 and the second corrugated teeth 1012 ensures sufficient elastic deformation space while enhancing the durability of the middle section, making it less prone to breakage. This design increases the work done on the trajectory of the toy 400, thereby improving launch speed and accelerating its rotation at the moment of launch. As a result, the Magnus effect occurs during the high-speed flight of the toy 400. At high rotational speeds, the turbulent boundary layer created by the shallow dimples reduces aerodynamic drag, enhancing the curved flight path.

Please refer to FIG. 3 again. The connector 100 is further provided with a first connecting portion 102, which is connected to the elastic portion 101 and is positioned within the inner cavity of the throwing rod handle. The first connecting portion 102 and the elastic portion 101 can be integrally formed using molding technology to achieve a secure connection between the two.

In the implementation process described above, the connector 100 is detachably connected to the throwing rod handle through the first connecting portion 102. After installation, the elastic portion 101 is positioned between the throwing rod handle and the throwing rod head 203, which helps enhance the curved flight path. At the same time, under the action of the first connecting portion 102, the connection between the connector 100 and the throwing rod handle is made more stable, preventing loosening. Additionally, it provides some elastic space, which helps prevent the connector 100 from being damaged or broken.

In some embodiments, the first connecting portion 102 of the connector 100 is configured with a first connecting surface on both opposing upper and lower sides, and the first connecting portion 102 is configured to a first rack which defines the first connecting surface which is configured with a plurality of first teeth 10201 which some of the first teeth 10201 are toward left side and some of the first teeth 10201 are toward right side. The position of the first rack is used to connect with the throwing rod handle to prevent detachment.

Exemplarily, the first connecting portion 102 is configured to a first reverse rack 1021, and the direction of inclination of the first teeth 10201 of the first reverse rack 1021 at both sides of the first connecting surface can be set to be consistent. For example, the upper side of the first teeth 10201 of the first reverse rack 1021 tilt toward the direction near the elastic portion 101. The first teeth 10201 of the first reverse racks 1021 at both sides can be arranged in a one-to-one correspondence, meaning that the first teeth 10201 at the upper and lower sides are positioned at the same vertical location of the first connecting portion 102. Of course, the arrangement can also allow for an interspersed and spaced distribution of the first reverse racks 1021 at both sides.

In the implementation process described above, the first connecting surface is connected to the throwing rod handle through the first rack, ensuring a more stable connection between the connector 100 and the throwing rod handle, preventing loosening. It also provides some elastic space to avoid damage or breakage of the connector 100.

Referring again to FIG. 3, the connector 100 is also provided with a second connecting portion 103, which is positioned on the side of the elastic portion 101 that is opposite to the first connecting portion 102. The second connecting portion 103 is configured in the inner cavity of the throwing rod head 203. The first connecting portion 102 and the elastic portion 101 can be integrally formed to secure both components together.

In the implementation process described above, the connector 100 is detachably connected to the throwing rod head 203 through the second connecting portion 103. After installation, the elastic portion 101 is positioned between the throwing rod handle and the throwing rod head 203, helping to increase the curved flight path. At the same time, under the action of the second connecting portion 103, the connection between the connector 100 and the throwing rod head 203 becomes more stable, preventing loosening, and provides some elastic space to avoid damage or breakage of the connector 100.

In some embodiments, the second connecting portion 103 has a second connecting surface on both opposing upper and lower sides, and the second connecting portion 103 is configured to a second rack which defines the second connecting surface which is configured with a plurality of second teeth 10301 which some of the second teeth 10301 are toward left side and some of the second teeth 10301 are toward right side. The position of the second rack is used to connect with the throwing rod head 203 to prevent detachment.

Exemplarily, the second connecting portion 103 is configured to a second reverse rack 1031, and the direction of inclination of the second teeth 10301 of the second reverse rack 1031 at both sides of the second connecting surface can be set to be consistent. For example, the upper side of the second teeth 10301 of the second reverse rack 1031 tilt toward the direction near the elastic portion 101. The second teeth 10301 at both sides can be arranged in a one-to-one correspondence, meaning that the second teeth 10301 at the upper and lower sides are positioned at the same vertical location of the second connecting portion 103. Of course, it is also possible to intersperse and distribute several second reverse racks 1031 at both sides.

To achieve good installation stability, the directions of inclination of the first teeth 10201 of the first reverse rack 1021 and the directions of inclination of the second teeth 10301 which is on the same side as the first teeth 10201 of the second reverse rack 1031 are configured to be opposite to each other, ensuring a more stable and secure connection after assembly, preventing detachment during use.

In the implementation process described above, the second connecting surface is connected to the throwing rod head 203 through the second rack, ensuring a more stable connection between the connector 100 and the throwing rod head 203, preventing loosening. It also provides some elastic space to avoid damage or breakage of the connector 100.

In some embodiments, the throwing rod handle includes a throwing rod member 201 and a handle member 202. The handle member 202 is positioned on the side of the throwing rod member 201 opposite to the connector 100, and the handle member 202 is connected to the throwing rod member 201.

Exemplarily, the throwing rod member 201 and the handle member 202 can be fixedly connected, such as by integrally forming, screw connections, etc., or can be rotationally connected. When the user grips the handle member 202 and throws the toy 400, the throwing direction should be perpendicular to the direction of rotation of the throwing rod member 201 relative to the handle member 202, or there can be an angle, such as greater than 90° or less than 90°, to avoid the throwing rod member 201 folding relative to the handle member 202 during the throw.

Figure 6:
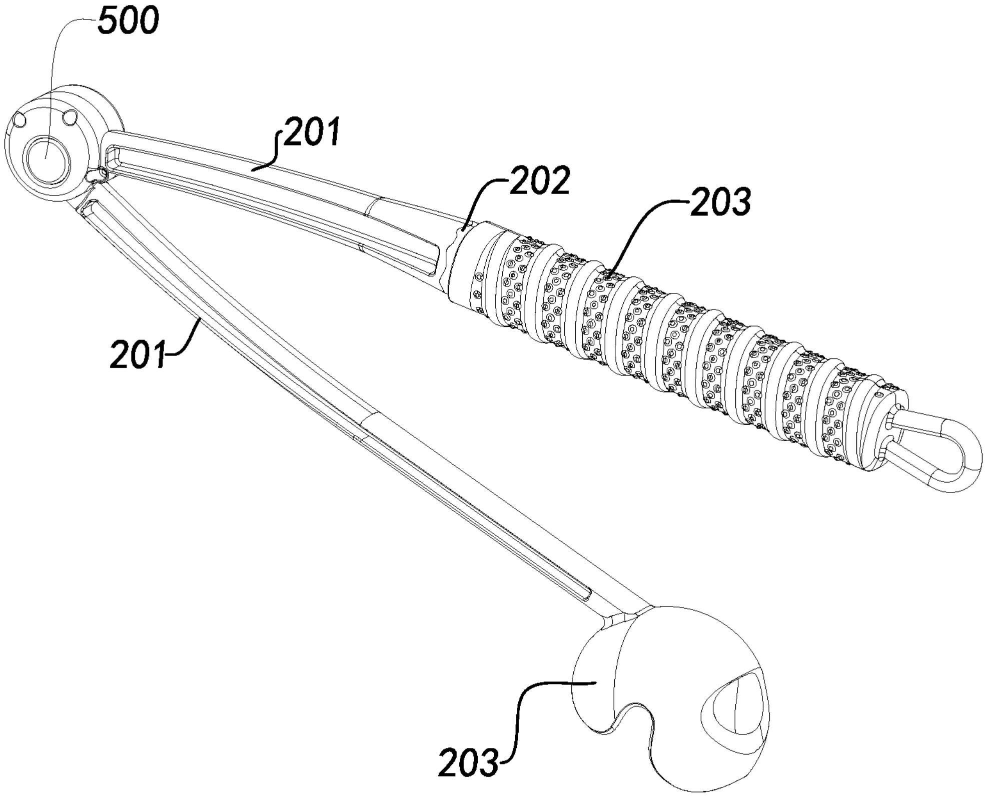
FIG. 6 is a schematic structural diagram of the folding handle of the throwing rod structure provided in another embodiment of this application.

As shown in FIG. 6, the throwing rod member 201 is configured to be foldable. That is, the throwing rod member 201 includes a first segment and a second segment. The first segment is rotatably connected to the second segment by a rotary fastener 500, and the side of the second segment opposite to the first segment is used for connection with the connector 100.

It should be noted that when the throwing rod member 201 is configured to be foldable by the rotary fastener 500, the throwing rod member 201 and the handle member 202 can be configured for relative rotation or for relative fixation.

When the throwing rod member 201 is folded and rotated relative to the handle member 202, the folding direction of the throwing rod member 201 should align with the direction of throwing during use.

In the implementation process described above, by configuring the throwing rod member 201 to be foldable, the size of the throwing rod member 201 can be reduced, reducing packaging space and facilitating convenient packaging and transportation. Additionally, after folding, a toy 400 can be installed within the throwing rod head 203, and once the throwing rod handle is straightened, the toy 400 is thrown. The increased acceleration of the toy's motion thread enables the throw to gain greater momentum, resulting in a farther distance.

During the design process, the inventors found that traditional throwing rods are usually integrally molded, which reduces manufacturing costs. However, when manufacturing the handle, the tactile feel is often less considered. More focus is placed on adding friction-enhancing patterns to improve grip. Considering the basic characteristics of plastic, over time it tends to age, harden, and wear down, causing the handle surface to become unusually smooth. After a period of use, this results in slipping, especially when the hands sweat, which significantly affects the user experience.

Therefore, as shown in FIGS. 1, 2, 4, and 6, the throwing rod structure further includes an anti-slip member 300, which is connected to the handle member 202 of the throwing rod handle.

Exemplarily, to provide a more comfortable grip during long throwing sessions or in hot summer conditions, and to avoid slippage caused by sweating or contact with water, one preferred solution is to use a hand strap (i.e., the anti-slip member 300). The hand strap is wrapped around the handle to improve sweat absorption and increase friction. A preferred material, such as polyurethane, which is soft and sweat-absorbent, can be chosen. The dimensions of the strap can be 27 mm*0.6 m*1100 mm. Another option is to directly use an anti-slip rubber sleeve (i.e., the anti-slip member 300) that is fitted over the plastic handle, preferably made of anti-slip materials. The sleeve can be injection-molded according to the handle's specific size. Furthermore, to achieve a more effective and long-lasting anti-slip effect, both anti-slip devices can be combined. That is, the anti-slip rubber sleeve is fitted first, followed by the hand strap wrapped over it. This combined approach provides better results, offering not only sweat absorption and anti-slip effects but also better wear resistance to ensure long-term durability.

In the implementation process described above, by placing the anti-slip member 300 on the throwing rod handle, the effects of improving sweat absorption and increasing friction are achieved. This prevents slippage during throwing and provides a more comfortable grip, thereby enhancing the user's experience.

In all embodiments of the present disclosure, "large" and "small" are relative, "more" and "less" are relative, and "upper" and "lower" are relative, and the expressions of such relative terms will not be described in detail in the embodiments of the present disclosure.

It is to be understood that references throughout the specification to "in this embodiment", "in an embodiment of the present disclosure", or "as an alternative embodiment" mean that a particular feature, structure, or characteristic related to the embodiment is comprised in at least one embodiment of the present disclosure. Therefore, the appearance of "in this embodiment", "in an embodiment of the present disclosure", or "as an alternative embodiment" in various places throughout the specification does not necessarily refer to the same embodiment. Furthermore, these particular features, structures, or characteristics may be incorporated in any suitable manner in one or more embodiments. Those skilled in the art should also understand that the embodiments described in the specification are all optional embodiments, and the acts and modules involved are not necessarily necessary for the present disclosure.

In various embodiments of the present disclosure, it should be understood that the size of the sequence numbers of the above-described processes does not mean the necessary order of execution, and the order of execution of each process should be determined by its function and internal logic, and should not constitute any limitation on the implementation of the embodiments of the present disclosure.

The above is merely a specific embodiment of the present disclosure, but the scope of protection of the present disclosure is not limited thereto, and any person skilled in the art can easily think of changes or substitutions within the technical scope disclosed in the present disclosure, and should be covered within the scope of protection of the present disclosure. Therefore, the scope of protection of the present disclosure should be the same as that of the claims.

What is claimed is:

1. A throwing rod structure, comprising:

a connector, configured with an elastic portion;

a throwing rod assembly, including a throwing rod handle and a throwing rod head, wherein the throwing rod handle and the throwing rod head are respectively detachably connected to the connector, wherein the elastic portion is located between the throwing rod handle and the throwing rod head;

wherein the connector further includes a first connecting portion, which is connected to the elastic portion, and the first connecting portion is located in the inner cavity of the throwing rod handle;

wherein two opposite upper and lower sides of the first connecting portion are provided with a first connecting surface, and the first connecting portion is configured to a first rack which defines the first connecting surface which is configured with a plurality of first teeth which some of the first teeth are toward left side and some of the first teeth are toward right side, wherein the position of the rack on the first connecting surface is used to connect with the throwing rod handle, wherein the connector further includes a second connecting portion, which is located on the side of the elastic portion opposite to the first connecting portion, wherein the second connecting portion is configured in the inner cavity of the throwing rod head;

wherein two opposite upper and lower sides of the second connecting portion are provided with a second connecting surface, and the second connecting portion is configured to a second rack which defines the second connecting surface which is configured with a plurality of second teeth which some of the second teeth are toward left side and some of the second teeth are toward right side, wherein the position of the rack on the second connecting portion is used to connect with the throwing rod head, wherein the throwing rod handle includes a throwing rod member and a handle member, which locates on the side of the throwing rod member opposite to the connector, wherein the handle member is connected to the throwing rod member;

wherein the first connecting portion is configured to a first reverse rack; wherein the second connecting portion is configured to a second reverse rack; the directions of inclination of the first teeth of the first reverse rack and the directions of inclination of the second teeth which is on the same side as the first teeth of the second reverse rack are configured to be opposite to each other.

2. The throwing rod structure according to claim 1, wherein the elastic portion is configured with a first elastic surface and a second elastic surface, wherein the first elastic surface and the second elastic surface are oppositely distributed, wherein at least a part of the structure of the first elastic surface is concave toward the second elastic surface to form a first corrugated tooth, wherein at least a part of the structure of the second elastic surface is concave toward the first elastic surface to form a second corrugated tooth.

3. The throwing rod structure according to claim 2, wherein the throwing rod member is configured to be foldable.

4. The throwing rod structure according to claim 3, wherein the throwing rod structure further includes an anti-slip member, with the anti-slip member being connected to the throwing rod handle.

5. The throwing rod structure according to claim 4, wherein the anti-slip member is specifically selected from a hand strap, an anti-slip rubber sleeve, or a combination of both.

6. The throwing rod structure according to claim 3, wherein the anti-slip member is specifically selected from a hand strap, an anti-slip rubber sleeve, or a combination of both.

7. The throwing rod structure according to claim 2, wherein the throwing rod structure further includes an anti-slip member, with the anti-slip member being connected to the throwing rod handle.

8. The throwing rod structure according to claim 7, wherein the anti-slip member is specifically selected from a hand strap, an anti-slip rubber sleeve, or a combination of both.

9. The throwing rod structure according to claim 2, wherein the anti-slip member is specifically selected from a hand strap, an anti-slip rubber sleeve, or a combination of both.

10. The throwing rod structure according to claim 1, wherein the throwing rod member is configured to be foldable.

11. The throwing rod structure according to claim 10, wherein the throwing rod structure further includes an anti-slip member, with the anti-slip member being connected to the throwing rod handle.

12. The throwing rod structure according to claim 11, wherein the anti-slip member is specifically selected from a hand strap, an anti-slip rubber sleeve, or a combination of both.

13. The throwing rod structure according to claim 10, wherein the anti-slip member is specifically selected from a hand strap, an anti-slip rubber sleeve, or a combination of both.

14. The throwing rod structure according to claim 1, wherein the throwing rod structure further includes an anti-slip member, with the anti-slip member being connected to the throwing rod handle.

15. The throwing rod structure according to claim 14, wherein the anti-slip member is specifically selected from a hand strap, an anti-slip rubber sleeve, or a combination of both.

16. The throwing rod structure according to claim 1, wherein the anti-slip member is specifically selected from a hand strap, an anti-slip rubber sleeve, or a combination of both.

* * * * *